US009391709B2

(12) United States Patent
Tamura et al.

(10) Patent No.: US 9,391,709 B2
(45) Date of Patent: Jul. 12, 2016

(54) OPTICAL TRANSMITTER MODULE (71) Applicant: Hitachi Metals, Ltd., Minato-ku, Tokyo (JP)

(72) Inventors: Kenichi Tamura, Hitachi (JP); Ryuta Takahashi, Hitachi (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 14/679,200

(22) Filed: Apr. 6, 2015

(65) Prior Publication Data

US 2015/0346433 A1 Dec. 3, 2015

(30) Foreign Application Priority Data

May 28, 2014 (JP) ................................. 2014-110670
Jan. 19, 2015 (JP) ................................. 2015-008071

(51) Int. Cl.
*H04J 14/02* (2006.01)
*H04B 10/50* (2013.01)
*G02B 6/42* (2006.01)

(52) U.S. Cl.
CPC ............ *H04B 10/506* (2013.01); *G02B 6/4215* (2013.01); *G02B 6/4246* (2013.01); *G02B 6/4206* (2013.01)

(58) Field of Classification Search
CPC .... G02B 6/293; G02B 6/4246; G02B 6/4215; G02B 6/4206; H04B 10/50; H04B 10/506; H04B 10/40
USPC ...................................................... 398/82, 79
See application file for complete search history.

(56) References Cited

U.S. PATENT DOCUMENTS

| 6,198,864 | B1 * | 3/2001 | Lemoff | G02B 6/29367 385/24 |
| 6,539,145 | B1 * | 3/2003 | Auracher | G02B 6/29365 385/17 |
| 8,160,451 | B2 * | 4/2012 | Liu | G02B 6/4201 398/135 |
| 9,065,587 | B2 * | 6/2015 | Sorin | H04B 10/504 |
| 2001/0030299 | A1 * | 10/2001 | Shiraishi | G03F 9/70 250/559.29 |
| 2003/0152113 | A1 * | 8/2003 | Kropp | G02B 6/29367 370/535 |
| 2003/0190126 | A1 * | 10/2003 | Toyoshima | G02B 5/285 385/120 |
| 2004/0208452 | A1 * | 10/2004 | Kropp | G02B 6/29367 385/47 |
| 2008/0175591 | A1 * | 7/2008 | Yu | G02B 6/2706 398/65 |

(Continued)

FOREIGN PATENT DOCUMENTS

| CN | 203385903 U | 1/2014 |
| JP | 2005-309370 A | 11/2005 |

(Continued)

*Primary Examiner* — Ken N Vanderpuye
*Assistant Examiner* — Abbas H. Alagheband
(74) *Attorney, Agent, or Firm* — Crowell & Moring LLP (57) ABSTRACT A multiplexing optical system in an optical transmitter module has first to third wavelength selective filters and a reflection mirror. The reflection mirror reflects a fourth optical signal to make it enter the first wavelength selective filter and reflects a third optical signal to make it enter the third wavelength selective filter. The third wavelength selective filter reflects a second optical signal to make it enter the second wavelength selective filter and transmits the third optical signal to make it enter the second wavelength selective filter. The first wavelength selective filter transmits a first optical signal to make it enter the second wavelength selective filter and reflects the fourth optical signal to make it enter the second wavelength selective filter. The second wavelength selective filter transmits the first and fourth optical signals and reflects the second and third optical signals to make them enter a lens.

10 Claims, 8 Drawing Sheets

(56) References Cited

U.S. PATENT DOCUMENTS

| | | | | |
|---|---|---|---|---|
| 2008/0193135 | A1* | 8/2008 | Du | G02B 6/29362 398/88 |
| 2009/0047024 | A1* | 2/2009 | Wang | H04B 10/40 398/135 |
| 2009/0103923 | A1* | 4/2009 | Hosomi | G02B 6/4215 398/91 |
| 2010/0054751 | A1* | 3/2010 | Murry | H04J 14/0206 398/137 |
| 2010/0135619 | A1* | 6/2010 | Choi | G02B 6/12007 385/88 |
| 2010/0209103 | A1* | 8/2010 | Sakigawa | G02B 6/4201 398/45 |
| 2010/0226655 | A1* | 9/2010 | Kim | G02B 6/4246 398/139 |
| 2010/0247043 | A1* | 9/2010 | Sugawara | G02B 6/4201 385/93 |
| 2010/0278482 | A1* | 11/2010 | Adachi | G02B 6/4204 385/33 |
| 2011/0200056 | A1* | 8/2011 | Diab | H04L 43/0882 370/463 |
| 2012/0189314 | A1* | 7/2012 | Xu | H04B 10/506 398/135 |
| 2013/0121651 | A1* | 5/2013 | Takahashi | G02B 6/262 385/89 |
| 2013/0148966 | A1* | 6/2013 | Kurokawa | H04J 14/02 398/65 |
| 2013/0322478 | A1* | 12/2013 | Adachi | H01S 5/34 372/45.01 |
| 2014/0133862 | A1* | 5/2014 | Fujimura | G02B 6/4215 398/79 |
| 2014/0270778 | A1* | 9/2014 | Hui | H04B 10/2503 398/79 |
| 2014/0321856 | A1* | 10/2014 | Saeki | H04B 10/501 398/79 |
| 2015/0030042 | A1* | 1/2015 | Kim | H01S 5/02292 372/20 |
| 2015/0037038 | A1* | 2/2015 | Takahashi | H04B 10/40 398/79 |
| 2015/0125163 | A1* | 5/2015 | Gui | H04B 10/572 398/201 |

FOREIGN PATENT DOCUMENTS

| | | |
|---|---|---|
| JP | 2013-104983 A | 5/2013 |
| JP | 2013-145356 A | 7/2013 |

* cited by examiner

FIRST WAVELENGTH SELECTIVE FILTER

FIG. 4B

SECOND WAVELENGTH SELECTIVE FILTER

FIG. 4C

THIRD WAVELENGTH SELECTIVE FILTER

FIRST WAVELENGTH SELECTIVE FILTER

FIG. 6B

SECOND WAVELENGTH SELECTIVE FILTER

FIG. 6C

THIRD WAVELENGTH SELECTIVE FILTER

OPTICAL TRANSMITTER MODULE

CROSS-REFERENCE TO RELATED APPLICATION

The present application claims priority from Japanese Patent Applications No. 2014-110670 filed on May 28, 2014 and No. 2015-008071 filed on Jan. 19, 2015, the contents of which are hereby incorporated by reference into this application.

TECHNICAL FIELD OF THE INVENTION

The present invention relates to an optical communication module, in particular to an optical transmitter module used for the wavelength division multiplex communication.

BACKGROUND OF THE INVENTION

In the field of optical communication, the transmission capacity per optical fiber cable has been increasing, and the wavelength division multiplex (WDM) communication has been known as one communication method for achieving the capacity increase. In the wavelength division multiplex communication, a plurality of optical signals each having different wavelengths are simultaneously transmitted through one optical fiber cable.

An optical transceiver is known as one of optical communication modules used for the wavelength division multiplex communication. The optical transceiver used for the wavelength division multiplex communication includes an optical transmitter module having at least a plurality of light emitting elements which emit lights (optical signals) each having different wavelengths and a multiplexing optical system which multiplexes the optical signals emitted from the light emitting elements. An ordinary multiplexing optical system is made up by the combination of a plurality of multi-layer filters (wavelength selective filter and reflection mirror) which transmit a light with a predetermined wavelength and reflect a light with a wavelength other than that (Japanese Patent Application Laid-Open Publication No. 2013-104983 (Patent Document 1), Japanese Patent Application Laid-Open Publication No. 2013-145356 (Patent Document 2), US Patent Application Publication No. 2012/189314 (Patent Document 3) and Japanese Patent Application Laid-Open Publication No. 2005-309370 (Patent Document 4)). The optical transmitter module is sometimes referred to as a transmitter optical sub-assembly (TOSA).

Figure 8:
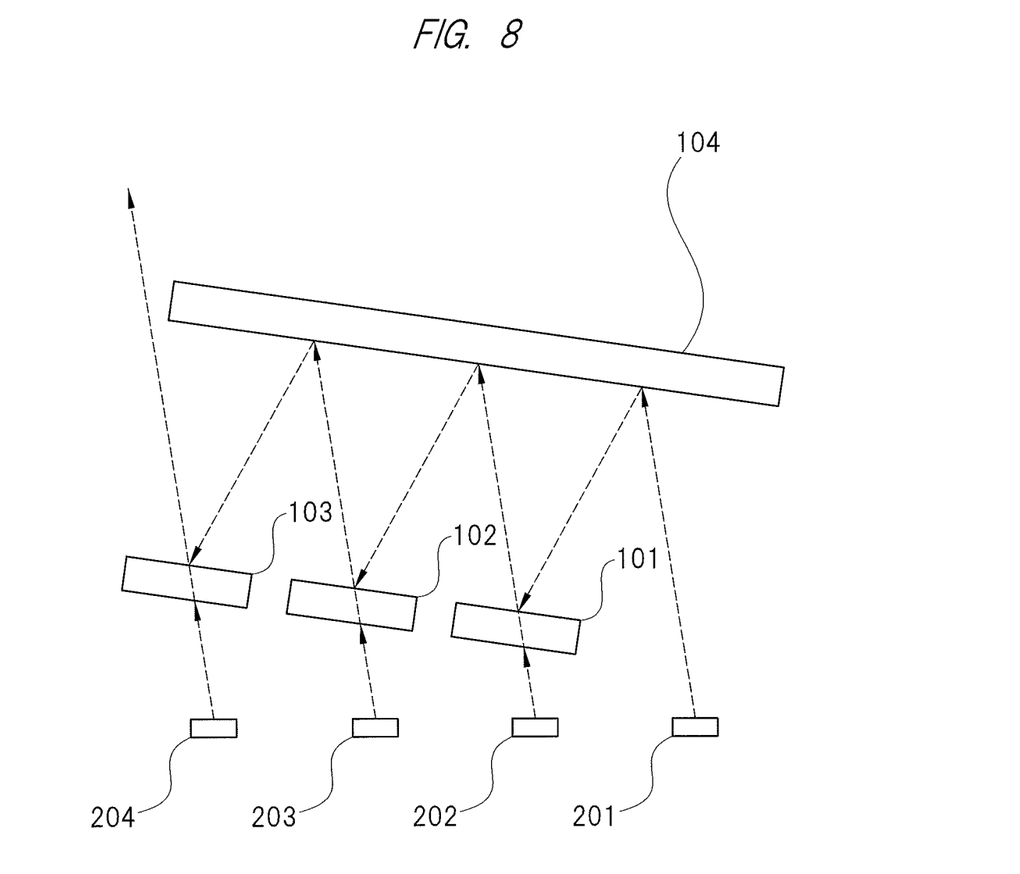
FIG. 8 is a schematic diagram showing a configuration of a multiplexing optical system used in a conventional optical transmitter module.

FIG. 8 shows a configuration example of a multiplexing optical system used for the conventional optical transmitter module. The multiplexing optical system shown in FIG. 8 is made up of three wavelength selective filters 101, 102 and 103 and one reflection mirror 104.

An optical signal emitted from a light emitting element 201 enters the reflection mirror 104. The optical signal which has entered the reflection mirror 104 is sequentially reflected by the reflection mirror 104, the wavelength selective filter 101, the reflection mirror 104, the wavelength selective filter 102, the reflection mirror 104 and the wavelength selective filter 103 and is then output.

An optical signal emitted from a light emitting element 202 passes through the wavelength selective filter 101 and enters the reflection mirror 104. The optical signal which has entered the reflection mirror 104 is sequentially reflected by the reflection mirror 104, the wavelength selective filter 102, the reflection mirror 104 and the wavelength selective filter 103 and is then output.

An optical signal emitted from a light emitting element 203 passes through the wavelength selective filter 102 and enters the reflection mirror 104. The optical signal which has entered the reflection mirror 104 is sequentially reflected by the reflection mirror 104 and the wavelength selective filter 103 and is then output.

An optical signal emitted from a light emitting element 204 passes through the wavelength selective filter 103 and is then output.

As described above, the optical signal emitted from the light emitting element 201 is reflected by the reflection mirror three times and reflected by the wavelength selective filters three times. The optical signal emitted from the light emitting element 202 passes through the wavelength selective filter once, is reflected by the reflection mirror twice and is reflected by the wavelength selective filters twice. The optical signal emitted from the light emitting element 203 passes through the wavelength selective filter once, is reflected by the reflection mirror once and is reflected by the wavelength selective filter once. The optical signal emitted from the light emitting element 204 passes through the wavelength selective filter once. In the following description, a total of the number of times the optical signal passes through the wavelength selective filter, the number of times the optical signal is reflected by the wavelength selective filter and the number of times the optical signal is reflected by the reflection mirror is referred to as "the number of filter transmissions". More specifically, the number of filter transmissions of the optical signal emitted from the light emitting element 201 shown in FIG. 8 is six (six reflections). Also, the number of filter transmissions of the optical signal emitted from the light emitting element 202 is five (one transmission and four reflections), the number of filter transmissions of the optical signal emitted from the light emitting element 203 is three (one transmission and two reflections), and the number of filter transmissions of the optical signal emitted from the light emitting element 204 is one (one transmission). Therefore, the maximum number of filter transmissions in the optical transmitter module having the multiplexing optical system shown in FIG. 8 is six.

SUMMARY OF THE INVENTION

As described above, the optical signal output from the optical transmitter module passes through the multi-layer filters several times in the module. However, the optical signal is more degraded as the number of filter transmissions increases. Also, when the number of reflections of the optical signal increases, there is fear that the angle deviation is accumulated and a large angle deviation finally occurs.

An object of the present invention is to reduce the number of filter transmissions of optical signals in an optical transmitter module as much as possible.

The optical transmitter module of the present invention is an optical transmitter module which outputs a multiplexed optical signal obtained by multiplexing four optical signals each having different wavelengths. The optical transmitter module includes: a first light emitting element which emits a first optical signal; a second light emitting element which emits a second optical signal; a third light emitting element which emits a third optical signal; a fourth light emitting element which emits a fourth optical signal; a first wavelength selective filter and a second wavelength selective filter disposed on a light path of the first optical signal along a traveling direction of the first optical signal; a third wavelength selective filter disposed on a light path of the second optical signal; a reflection mirror disposed on light paths of the third optical signal and the fourth optical signal; and a lens from which a multiplexed optical signal obtained by multiplexing the first optical signal, the second optical signal, the third optical signal and the fourth optical signal is emitted. The reflection mirror reflects the fourth optical signal to make the fourth optical signal enter the first wavelength selective filter and reflects the third optical signal to make the third optical signal enter the third wavelength selective filter. The third wavelength selective filter reflects the second optical signal to make the second optical signal enter the second wavelength selective filter and transmits the third optical signal reflected by the reflection mirror to make the third optical signal enter the second wavelength selective filter. The first wavelength selective filter transmits the first optical signal to make the first optical signal enter the second wavelength selective filter and reflects the fourth optical signal reflected by the reflection mirror to make the fourth optical signal enter the second wavelength selective filter. The second wavelength selective filter transmits the first optical signal which has passed through the first wavelength selective filter and the fourth optical signal reflected by the first wavelength selective filter to make the first optical signal and the fourth optical signal enter the lens and reflects the second optical signal reflected by the third wavelength selective filter and the third optical signal which has passed through the third wavelength selective filter to make the second optical signal and the third optical signal enter the lens.

In an aspect of the present invention, an optical transmitter module includes: a first light emitting element which emits a first optical signal; a second light emitting element which emits a second optical signal; a third light emitting element which emits a third optical signal; a fourth light emitting element which emits a fourth optical signal; a first wavelength selective filter and a second wavelength selective filter disposed on a light path of the first optical signal along a traveling direction of the first optical signal; a third wavelength selective filter disposed on a light path of the second optical signal; a first reflection mirror disposed on a light path of the third optical signal; a second reflection mirror disposed on a light path of the fourth optical signal; and a lens from which a multiplexed optical signal obtained by multiplexing the first optical signal, the second optical signal, the third optical signal and the fourth optical signal is emitted. The first reflection mirror reflects the third optical signal to make the third optical signal enter the first wavelength selective filter. The second reflection mirror reflects the fourth optical signal to make the fourth optical signal enter the third wavelength selective filter. The first wavelength selective filter transmits the first optical signal to make the first optical signal enter the second wavelength selective filter and reflects the third optical signal reflected by the first reflection mirror to make the third optical signal enter the second wavelength selective filter. The third wavelength selective filter reflects the second optical signal to make the second optical signal enter the second wavelength selective filter and transmits the fourth optical signal reflected by the second reflection mirror to make the fourth optical signal enter the second wavelength selective filter. The second wavelength selective filter transmits the first optical signal which has passed through the first wavelength selective filter and the third optical signal reflected by the first wavelength selective filter to make the first optical signal and the third optical signal enter the lens and reflects the second optical signal reflected by the third wavelength selective filter and the fourth optical signal which has passed through the third wavelength selective filter to make the second optical signal and the fourth optical signal enter the lens.

According to the present invention, it is possible to reduce the number of filter transmissions of optical signals in an optical transmitter module.

DESCRIPTIONS OF THE PREFERRED EMBODIMENTS

First Embodiment

Hereinafter, an example of an optical communication module to which the present invention is applied will be described in detail with reference to accompanying drawings. The optical communication module described below is a WDM optical transceiver compliant with QSFP+ (Quad Small Form-factor Pluggable Plus) standard, and it inputs and outputs multiplexed optical signals obtained by multiplexing a plurality of optical signals having different wavelengths.

Figure 1:
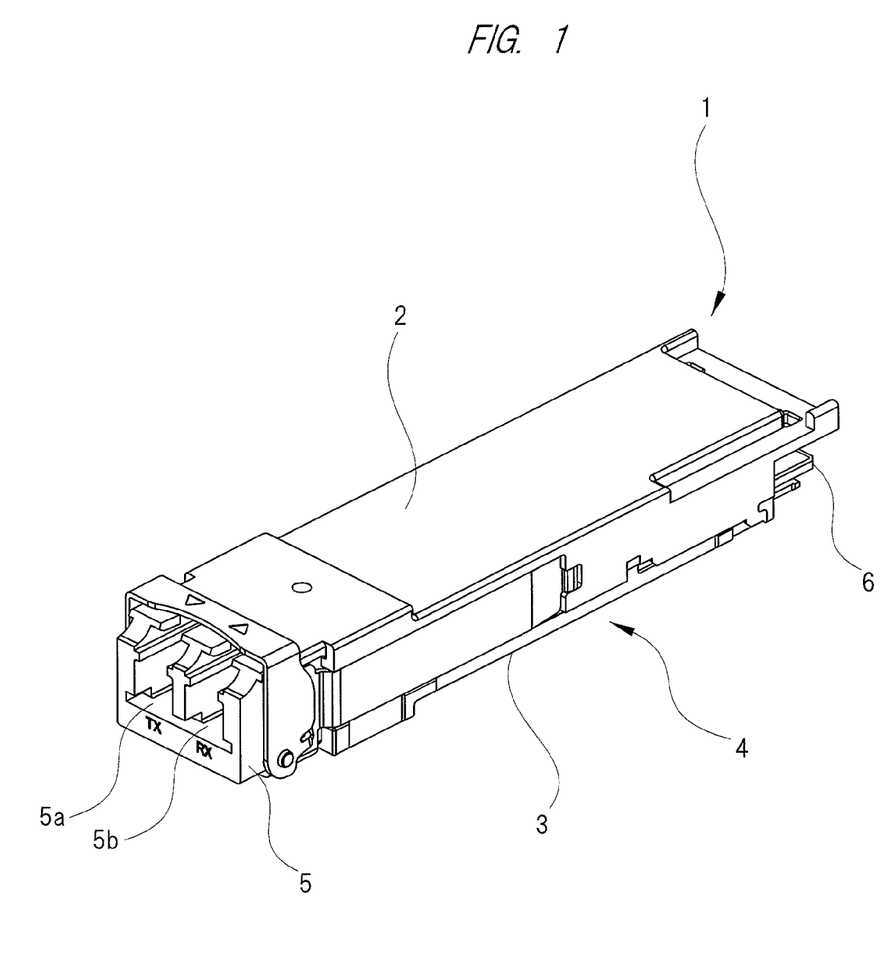
FIG. 1 is an external perspective view of an optical transceiver.

As shown in FIG. 1, an optical transceiver 1 of this embodiment has a module chassis 4 made up of an upper case 2 and a lower case 3. The module chassis 4 has a substantially cuboid external appearance as a whole, and has a size compliant with the QSFP+ standard. An optical adaptor 5 is provided at one longitudinal end of the module chassis 4, and a card edge 6 is provided at the other longitudinal end of the module chassis 4. Note that the card edge is sometimes referred to as "edge connector". In the following description, of the both longitudinal ends of the module chassis 4, one end side on which the optical adaptor 5 is provided is referred to as "front side" and the other end side on which the card edge 6 is provided is referred to as "rear side" in some cases. More specifically, the optical adaptor 5 is provided on the front side of the module chassis 4 and the card edge 6 is provided on the rear side of the module chassis 4.

The optical adaptor 5 has two insertion ports 5a and 5b to which an optical connector attached to one end of an optical fiber cable (not shown) is inserted. One insertion port 5a is a transmitter port (TX) and the other insertion port 5b is a receiver port (RX). Also, when the card edge 6 is inserted into a slot provided in a network device (router, server or others (not shown)), the optical transceiver 1 and the network device are connected. The optical transceiver 1 converts an electric signal input from the connected network device into an optical signal and outputs it to an optical fiber cable connected to the transmitter insertion port 5a, and it also converts an optical signal input from an optical fiber cable connected to the receiver insertion port 5b into an electric signal and outputs it to a network device.

Figure 2:
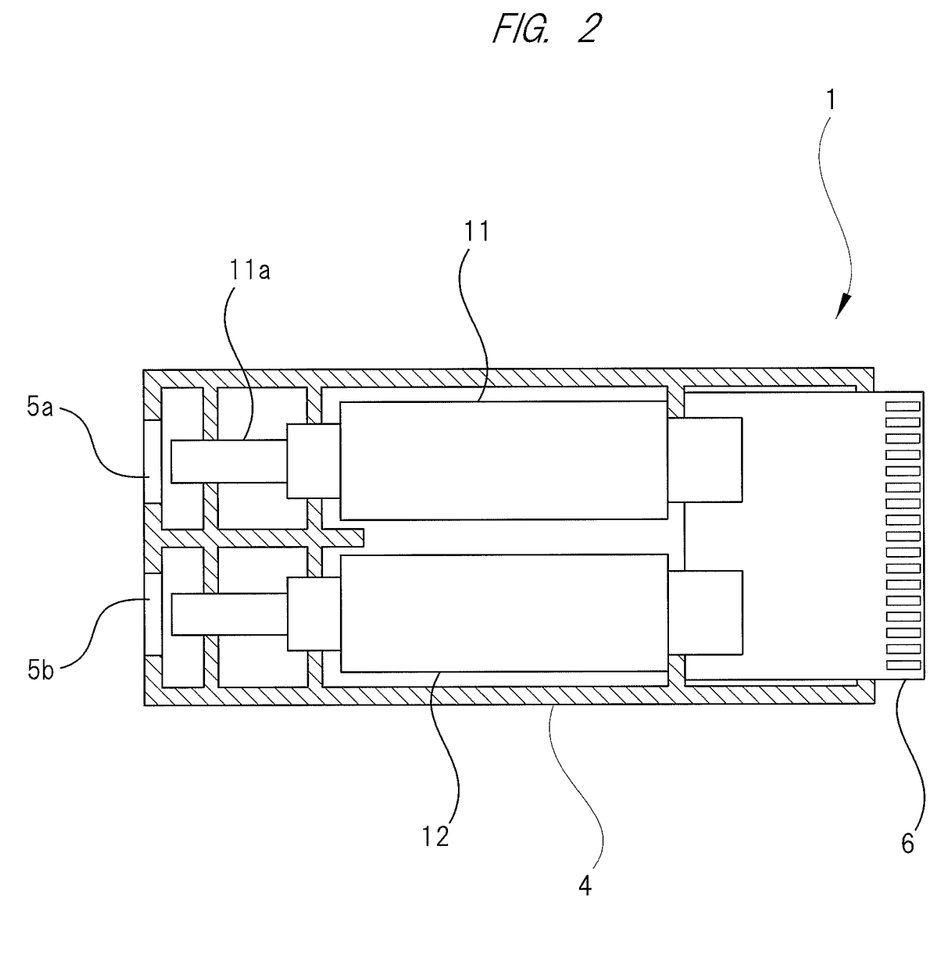
FIG. 2 is a sectional view showing an internal structure of the optical transceiver.

As shown in FIG. 2, an optical transmitter module 11 and an optical receiver module 12 for achieving the above-described photoelectric conversion are housed inside the module chassis 4. In the following description, the optical transmitter module 11 is referred to as "transmitter optical sub-assembly 11" and the optical receiver module 12 is referred to as "receiver optical sub-assembly 12".

Figure 3:
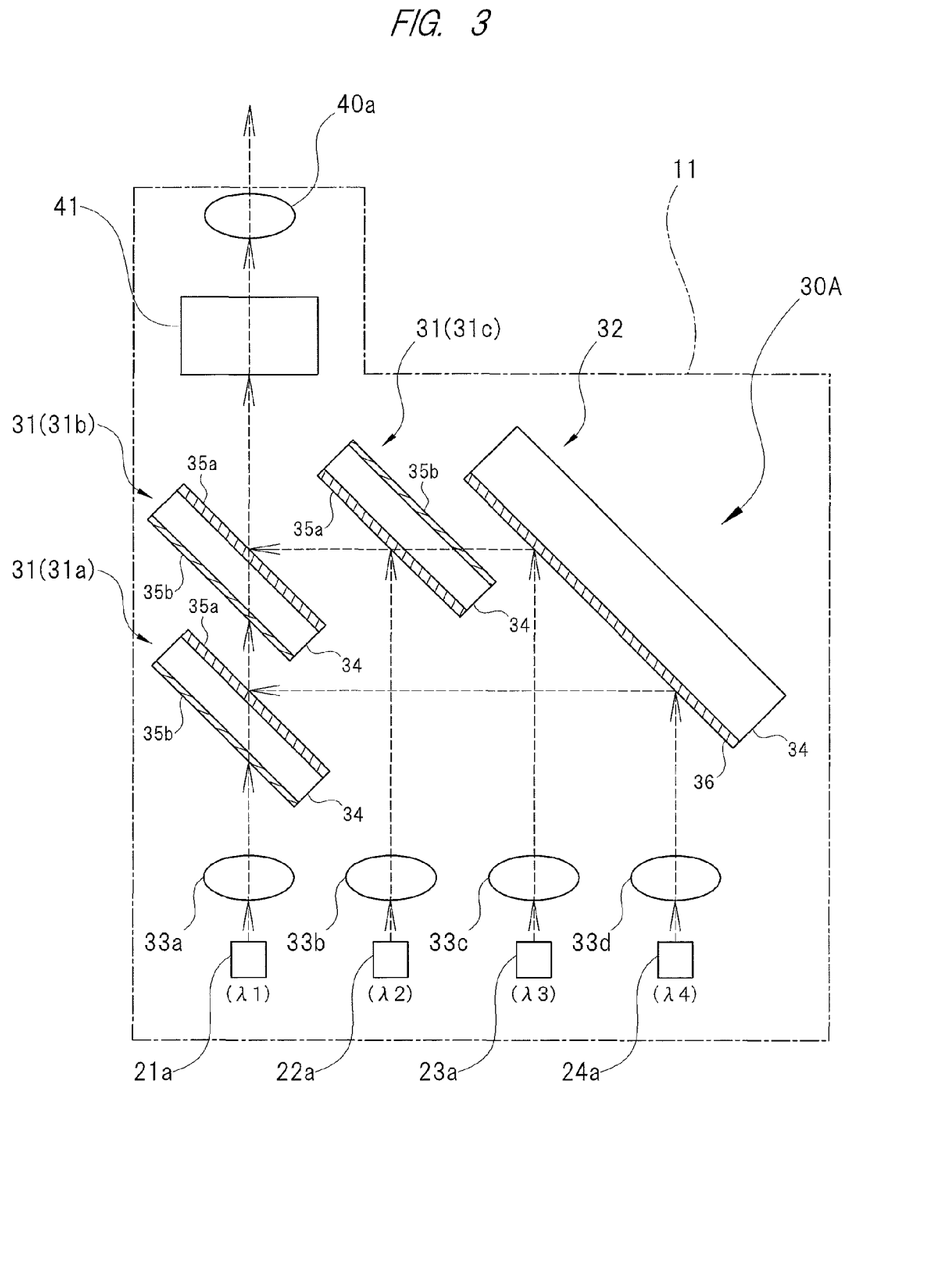
FIG. 3 is a schematic diagram showing a configuration of an optical transmitter module (transmitter optical sub-assembly)

As shown in FIG. 3, the transmitter optical sub-assembly 11 has a light emitting element 21a serving as a first light emitting element, a light emitting element 22a serving as a second light emitting element, a light emitting element 23a serving as a third light emitting element, a light emitting element 24a serving as a fourth light emitting element, a multiplexing optical system 30A which multiplexes optical signals emitted from these light emitting elements, a lens 40a from which the optical signal multiplexed by the multiplexing optical system 30A (multiplexed optical signal) is emitted, and an isolator 41 disposed between the multiplexing optical system 30A and the lens 40a.

The light emitting element 21a to the light emitting element 24a are semiconductor lasers. In the following description, the light emitting element 21a is referred to as "LD 21a" and the optical signal emitted from the LD 21a is referred to as "first optical signal". Similarly, the light emitting element 22a is referred to as "LD 22a" and the optical signal emitted from the LD 22a is referred to as "second optical signal". Also, the light emitting element 23a is referred to as "LD 23a" and the optical signal emitted from the LD 23a is referred to as "third optical signal". Furthermore, the light emitting element 24a is referred to as "LD 24a" and the optical signal emitted from the LD 24a is referred to as "fourth optical signal". On the other hand, the LD 21a to LD 24a are collectively referred to as "light emitting element" and the first to fourth optical signals are collectively referred to as "optical signal" in some cases.

The LD 21a, the LD 22a, the LD 23a and the LD 24a are disposed in this order in a row. The oscillation wavelength (center wavelength) of the LD 21a is $\lambda 1$ [nm], the oscillation wavelength (center wavelength) of the LD 22a is $\lambda 2$ [nm], the oscillation wavelength (center wavelength) of the LD 23a is $\lambda 3$ [nm] and the oscillation wavelength (center wavelength) of the LD 24a is $\lambda 4$ [nm]. In other words, the wavelength of the first optical signal is $\lambda 1$ [nm], the wavelength of the second optical signal is $\lambda 2$ [nm], the wavelength of the third optical signal is $\lambda 3$ [nm], and the wavelength of the fourth optical signal is $\lambda 4$ [nm]. These wavelengths have the magnitude relation of $\lambda 1 < \lambda 4 < \lambda 2 < \lambda 3$. The spacing between each of the wavelengths is 20 [nm]. Also, the wavelength of the first optical signal ($\lambda 1$ [nm]) and the wavelength of the fourth optical signal ($\lambda 4$ [nm]) are wavelengths adjacent to each other. In other words, the second optical signal and the third optical signal belong to bands other than the band to which the first optical signal and the fourth optical signal belong.

The multiplexing optical system 30A shown in FIG. 3 multiplexes the four optical signals each having different wavelengths. The multiplexing optical system 30A is made up of a plurality of multi-layer filters each having a translucent substrate and an optical thin film formed on at least one surface of the substrate. Concretely, the multiplexing optical system 30A is made up of three wavelength selective filters 31 (first wavelength selective filter 31a, second wavelength selective filter 31b and third wavelength selective filter 31c) and one reflection mirror 32. The details of the structure of the wavelength selective filter 31 and the reflection mirror 32 will be described later.

As shown in FIG. 3, the first wavelength selective filter 31a and the second wavelength selective filter 31b are disposed on a light path (first light path) through which the first optical signal emitted from the LD 21a travels, and intersect with the first light path. Further, the first wavelength selective filter 31a and the second wavelength selective filter 31b are disposed in this order in a row along the traveling direction of the first optical signal. On the first light path, a collimator lens 33a which collimates the first optical signal emitted from the LD 21a is disposed between the LD 21a and the first wavelength selective filter 31a.

The third wavelength selective filter 31c is disposed on a light path (second light path) through which the second optical signal emitted from the LD 22a travels, and intersects with the second light path. On the second light path, a collimator lens 33b which collimates the second optical signal emitted from the LD 22a is disposed between the LD 22a and the third wavelength selective filter 31c.

The reflection mirror 32 is disposed on a light path (third light path) through which the third optical signal emitted from the LD 23a travels and on a light path (fourth light path) through which the fourth optical signal emitted from the LD 24a travels, and intersects with the third light path and the fourth light path. On the third light path, a collimator lens 33c which collimates the third optical signal emitted from the LD 23a is disposed between the LD 23a and the reflection mirror 32. Also, on the fourth light path, a collimator lens 33d which collimates the fourth optical signal emitted from the LD 24a is disposed between the LD 24a and the reflection mirror 32.

Each wavelength selective filter 31 has a glass substrate 34 and dielectric films 35a and 35b formed on both surfaces of the glass substrate 34. The dielectric film 35a formed on one surface of the glass substrate 34 is an optical thin film for providing predetermined optical transmission characteristics to each wavelength selective filter 31, and the dielectric film 35b formed on the other surface of the glass substrate 34 is an optical thin film for preventing the light reflection. Thus, in the following description, the dielectric film 35a formed on one surface of the glass substrate 34 is referred to as "wavelength selective film 35a" and the dielectric film 35b formed on the other surface of the glass substrate 34 is referred to as "antireflection film 35b". Also, one main surface of the wavelength selective filter 31 on which the wavelength selective film 35a is formed is referred to as "front surface", and the other main surface of the wavelength selective filter 31 on which the antireflection film 35b is formed is referred to as "back surface". More specifically, the wavelength selective film 35a is formed on the front surface of each wavelength selective filter 31 and the antireflection film 35b is formed on the back surface of each wavelength selective filter 31.

The reflection mirror 32 has a glass substrate 34 and a dielectric film 36 formed on one surface of the glass substrate

34. The dielectric film 36 is an optical thin film having the characteristics of reflecting the lights at substantially all wavelengths with no transmission. Thus, in the following description, the dielectric film 36 is referred to as "reflection film 36". More specifically, the reflection mirror 32 is a total reflection mirror having the reflection film 36 formed on one surface thereof.

Figure 4A:
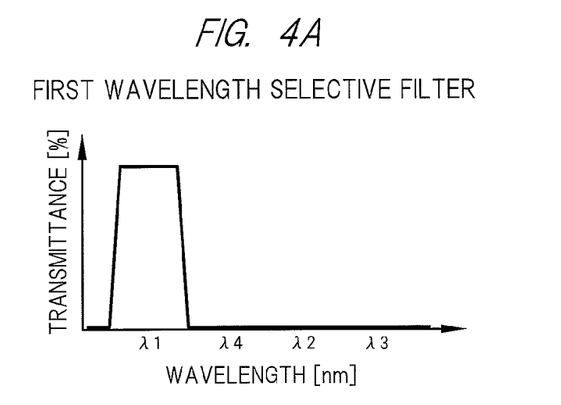
FIG. 4A is a diagram showing optical transmission characteristics of a first wavelength selective filter shown in FIG. 3.
Figure 4B:
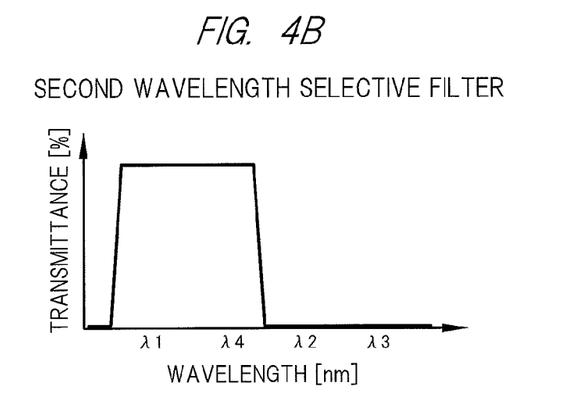
FIG. 4B is a diagram showing optical transmission characteristics of a second wavelength selective filter shown in FIG. 3.
Figure 4C:
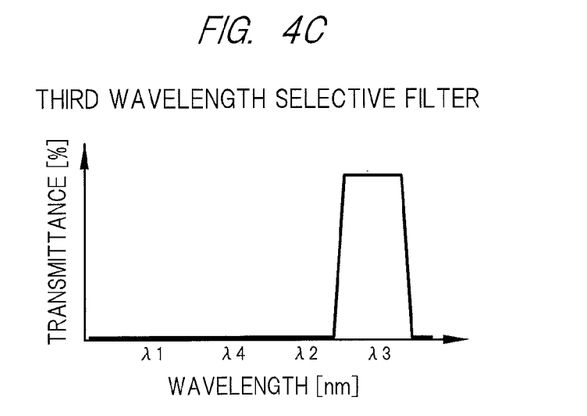
FIG. 4C is a diagram showing optical transmission characteristics of a third wavelength selective filter shown in FIG. 3.

FIG. 4A to FIG. 4C show the optical transmission characteristics of each of the wavelength selective filters 31. As shown in FIG. 4A, the first wavelength selective filter 31a is a band-pass filter which transmits at least the first optical signal ($\lambda 1$ [nm]) and reflects at least the fourth optical signal ($\lambda 4$ [nm]).

As shown in FIG. 4B, the second wavelength selective filter 31b is a band-pass filter which transmits at least the first optical signal ($\lambda 1$ [nm]) and the fourth optical signal ($\lambda 4$ [nm]) and reflects at least the second optical signal ($\lambda 2$ [nm]) and the third optical signal ($\lambda 3$ [nm]).

As shown in FIG. 4C, the third wavelength selective filter 31c is a band-pass filter which transmits at least the third optical signal ($\lambda 3$ [nm]) and reflects at least the second optical signal ($\lambda 2$ [nm]).

With reference to FIG. 3 again, the first optical signal emitted from the LD 21a enters the first wavelength selective filter 31a through the collimator lens 33a. Strictly, the first optical signal enters the first wavelength selective filter 31a from the back surface of the first wavelength selective filter 31a. Since the first wavelength selective filter 31a has the optical transmission characteristics (wavelength selective characteristics) shown in FIG. 4A, the first optical signal which has entered the first wavelength selective filter 31a passes through the first wavelength selective filter 31a and enters the second wavelength selective filter 31b. Strictly, the first optical signal which has passed through the first wavelength selective filter 31a enters the second wavelength selective filter 31b from the back surface of the second wavelength selective filter 31b. Since the second wavelength selective filter 31b has the optical transmission characteristics shown in FIG. 4B, the first optical signal which has entered the second wavelength selective filter 31b passes through the second wavelength selective filter 31b and enters the lens 40a through the isolator 41. As described above, the first optical signal sequentially passes through the first wavelength selective filter 31a and the second wavelength selective filter 31b to reach the lens 40a. That is, the number of filter transmissions of the first optical signal is two.

The second optical signal emitted from the LD 22a enters the third wavelength selective filter 31c through the collimator lens 33b. Strictly, the second optical signal enters the third wavelength selective filter 31c at an incident angle of 45 degrees from the front surface of the third wavelength selective filter 31c. Since the third wavelength selective filter 31c has the optical transmission characteristics shown in FIG. 4C, the second optical signal which has entered the third wavelength selective filter 31c is reflected by the third wavelength selective filter 31c and enters the second wavelength selective filter 31b. Strictly, the second optical signal reflected by the third wavelength selective filter 31c enters the second wavelength selective filter 31b at an incident angle of 45 degrees from the front surface of the second wavelength selective filter 31b. Since the second wavelength selective filter 31b has the optical transmission characteristics shown in FIG. 4B, the second optical signal which has entered the second wavelength selective filter 31b is reflected by the second wavelength selective filter 31b and enters the lens 40a through the isolator 41. As described above, the second optical signal is sequentially reflected by the third wavelength selective filter 31c and the second wavelength selective filter 31b to reach the lens 40a. That is, the number of filter transmissions of the second optical signal is two.

The third optical signal emitted from the LD 23a enters the reflection mirror 32 at an incident angle of 45 degrees through the collimator lens 33c. The third optical signal which has entered the reflection mirror 32 is reflected by the reflection mirror 32 and enters the third wavelength selective filter 31c. Strictly, the third optical signal reflected by the reflection mirror 32 enters the third wavelength selective filter 31c from the back surface of the third wavelength selective filter 31c. Since the third wavelength selective filter 31c has the optical transmission characteristics shown in FIG. 4C, the third optical signal which has entered the third wavelength selective filter 31c passes through the third wavelength selective filter 31c and enters the second wavelength selective filter 31b. Strictly, the third optical signal which has passed through the third wavelength selective filter 31c enters the second wavelength selective filter 31b at an incident angle of 45 degrees from the front surface of the second wavelength selective filter 31b. Since the second wavelength selective filter 31b has the optical transmission characteristics shown in FIG. 4B, the third optical signal which has entered the second wavelength selective filter 31b is reflected by the second wavelength selective filter 31b and enters the lens 40a through the isolator 41. As described above, the third optical signal is reflected by the reflection mirror 32, passes through the third wavelength selective filter 31c and is reflected by the second wavelength selective filter 31b to reach the lens 40a. That is, the number of filter transmissions of the third optical signal is three.

The fourth optical signal emitted from the LD 24a enters the reflection mirror 32 at an incident angle of 45 degrees through the collimator lens 33d. The fourth optical signal which has entered the reflection mirror 32 is reflected by the reflection mirror 32 and enters the first wavelength selective filter 31a. Strictly, the first optical signal reflected by the reflection mirror 32 enters the first wavelength selective filter 31a at an incident angle of 45 degrees from the front surface of the first wavelength selective filter 31a. Since the first wavelength selective filter 31a has the optical transmission characteristics shown in FIG. 4A, the fourth optical signal which has entered the first wavelength selective filter 31a is reflected by the first wavelength selective filter 31a and enters the second wavelength selective filter 31b. Strictly, the fourth optical signal reflected by the first wavelength selective filter 31a enters the second wavelength selective filter 31b from the back surface of the second wavelength selective filter 31b. Since the second wavelength selective filter 31b has the optical transmission characteristics shown in FIG. 4B, the fourth optical signal which has entered the second wavelength selective filter 31b passes through the second wavelength selective filter 31b and enters the lens 40a through the isolator 41. As described above, the fourth optical signal is reflected by the reflection mirror 32, is reflected by the first wavelength selective filter 31a and passes through the second wavelength selective filter 31b to reach the lens 40a. That is, the number of filter transmissions of the fourth optical signal is three.

As described above, the reflection mirror 32 reflects the fourth optical signal emitted from the LD 24a to make the fourth optical signal enter the first wavelength selective filter 31a, and reflects the third optical signal emitted from the LD 23a to make the third optical signal enter the third wavelength selective filter 31c.

The third wavelength selective filter 31c reflects the second optical signal emitted from the LD 22a to make the second optical signal enter the second wavelength selective filter 31b, and transmits the third optical signal reflected by the reflection mirror 32 to make the third optical signal enter the second wavelength selective filter 31b.

The first wavelength selective filter 31a transmits the first optical signal emitted from the LD 21a to make the first optical signal enter the second wavelength selective filter 31b, and reflects the fourth optical signal reflected by the reflection mirror 32 to make the fourth optical signal enter the second wavelength selective filter 31b.

The second wavelength selective filter 31b transmits the first optical signal which has passed through the first wavelength selective filter 31a and the fourth optical signal reflected by the first wavelength selective filter 31a to make the first optical signal and the fourth optical signal enter the lens 40a. Also, the second wavelength selective filter 31b reflects the second optical signal reflected by the third wavelength selective filter 31c and the third optical signal which has passed through the third wavelength selective filter 31c to make the second optical signal and the third optical signal enter the lens 40a. As a result, the multiplexed optical signal obtained by multiplexing the first optical signal, the second optical signal, the third optical signal and the fourth optical signal is emitted from the lens 40a.

As described above, the second wavelength selective filter 31b needs to transmit both of the first optical signal and the fourth optical signal. Therefore, in this embodiment, the wavelength of the first optical signal ($\lambda1$ [nm]) and the wavelength of the fourth optical signal ($\lambda4$ [nm]) are set to the wavelengths adjacent to each other.

The lens 40a is disposed at an inner end of a receptacle 11a shown in FIG. 2, and the multiplexed optical signal is output to outside through this lens 40a.

Note that the receiver optical sub-assembly 12 shown in FIG. 2 has substantially the same structure as that of the transmitter optical sub-assembly 11.

As described above, the number of filter transmissions of the optical signals in the transmitter optical sub-assembly (optical transmitter module) 11 and the receiver optical sub-assembly (optical receiver module) 12 of this embodiment is three at most. More specifically, the optical transmitter module of this embodiment and the conventional optical transmitter module including the multiplexing optical system shown in FIG. 8 multiplex the same number of optical signals by the wavelength division multiplexing and output the multiplexed optical signal. However, the maximum number of filter transmissions of the optical signal in the conventional optical transmitter module is six, whereas the maximum number of filter transmissions of the optical signal in the optical transmitter module of this embodiment is three.

Second Embodiment

Hereinafter, another example of an optical communication module to which the present invention is applied will be described in detail with reference to accompanying drawings. Nevertheless, the optical communication module of this embodiment has the basic configuration similar to that of the optical communication module of the first embodiment. However, the optical communication module of this embodiment and the optical communication module of the first embodiment are different in the specific configuration of the transmitter optical sub-assembly and the receiver optical sub-assembly. Thus, the configuration of the transmitter optical sub-assembly and the receiver optical sub-assembly provided in the optical communication module of this embodiment will be described below. Note that the description of the same configuration as that described above is appropriately omitted. Also, the same configuration as that described above is denoted by the same reference character.

Figure 5:
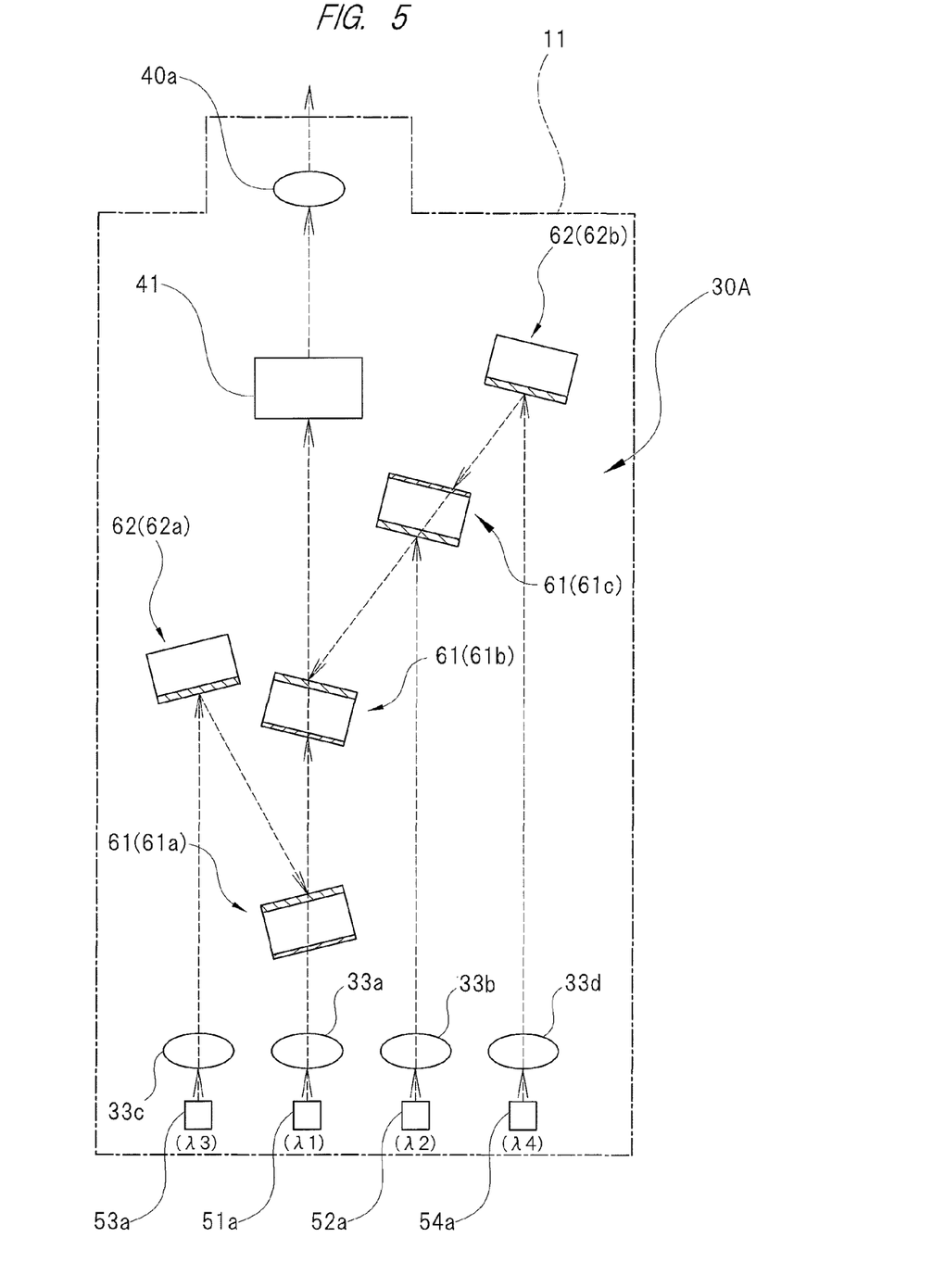
FIG. 5 is a schematic diagram showing another configuration of an optical transmitter module (transmitter optical sub-assembly)

As shown in FIG. 5, the transmitter optical sub-assembly 11 provided in the optical communication module of this embodiment has a light emitting element 51a serving as a first light emitting element, a light emitting element 52a serving as a second light emitting element, a light emitting element 53a serving as a third light emitting element, a light emitting element 54a serving as a fourth light emitting element, a multiplexing optical system 30A which multiplexes optical signals emitted from these light emitting elements, a lens 40a from which the optical signal multiplexed by the multiplexing optical system 30A (multiplexed optical signal) is emitted, and an isolator 41 disposed between the multiplexing optical system 30A and the lens 40a.

The light emitting element 51a to the light emitting element 54a are semiconductor lasers. In the following description, the light emitting element 51a is referred to as "LD 51a" and the optical signal emitted from the LD 51a is referred to as "first optical signal". Similarly, the light emitting element 52a is referred to as "LD 52a" and the optical signal emitted from the LD 52a is referred to as "second optical signal". Also, the light emitting element 53a is referred to as "LD 53a" and the optical signal emitted from the LD 53a is referred to as "third optical signal". Furthermore, the light emitting element 54a is referred to as "LD 54a" and the optical signal emitted from the LD 54a is referred to as "fourth optical signal". On the other hand, the LD 51a to LD 54a are collectively referred to as "light emitting element" and the first to fourth optical signals are collectively referred to as "optical signal" in some cases.

The LD 53a, the LD 51a, the LD 52a and the LD 54a are disposed in this order in a row. The oscillation wavelength (center wavelength) of the LD 51a is $\lambda1$ [nm], the oscillation wavelength (center wavelength) of the LD 52a is $\lambda2$ [nm], the oscillation wavelength (center wavelength) of the LD 53a is $\lambda3$ [nm] and the oscillation wavelength (center wavelength) of the LD 54a is $\lambda4$ [nm]. In other words, the wavelength of the first optical signal is $\lambda1$ [nm], the wavelength of the second optical signal is $\lambda2$ [nm], the wavelength of the third optical signal is $\lambda3$ [nm], and the wavelength of the fourth optical signal is $\lambda4$ [nm]. These wavelengths have the magnitude relation of $\lambda3<\lambda1<\lambda2<\lambda4$. Also, the spacing between each of the wavelengths is 20 [nm]. Namely, the wavelength of the first optical signal emitted from the LD 51a is longer than the wavelength of the third optical signal emitted from the LD 53a. Also, the wavelength of the second optical signal emitted from the LD 52a is longer than the wavelength of the first optical signal, and the wavelength of the fourth optical signal emitted from the LD 54a is longer than the wavelength of the second optical signal.

The multiplexing optical system 30A shown in FIG. 5 multiplexes the four optical signals each having different wavelengths. The multiplexing optical system 30A is made up of a plurality of multi-layer filters. Concretely, the multiplexing optical system 30A is made up of three wavelength selective filters 61 (first wavelength selective filter 61a, second wavelength selective filter 61b and third wavelength selective filter 61c) and two reflection mirrors 62 (first reflection mirror 62a and second reflection mirror 62b).

The wavelength selective filter 61 and the reflection mirror 62 of this embodiment have the same structures as those of the wavelength selective filter 31 and the reflection mirror 32 of the first embodiment. More specifically, each wavelength selective filter 61 has a glass substrate and dielectric films formed on both surfaces of the glass substrate, and the dielectric film formed on one surface of the glass substrate provides predetermined optical transmission characteristics to each wavelength selective filter 61. Also, each reflection mirror 62 has a glass substrate and a dielectric film formed on one surface of the glass substrate and this dielectric film has the characteristics of reflecting the lights at substantially all wavelengths with no transmission.

As shown in FIG. 5, the first wavelength selective filter 61a and the second wavelength selective filter 61b are disposed on a light path (first light path) through which the first optical signal emitted from the LD 51a travels, and intersect with the first light path. Further, the first wavelength selective filter 61a and the second wavelength selective filter 61b are disposed in this order in a row along the traveling direction of the first optical signal. On the first light path, a collimator lens 33a which collimates the first optical signal emitted from the LD 51a is disposed between the LD 51a and the first wavelength selective filter 61a.

The third wavelength selective filter 61c is disposed on a light path (second light path) through which the second optical signal emitted from the LD 52a travels, and intersects with the second light path. On the second light path, a collimator lens 33b which collimates the second optical signal emitted from the LD 52a is disposed between the LD 52a and the third wavelength selective filter 61c.

The first reflection mirror 62a is disposed on a light path (third light path) through which the third optical signal emitted from the LD 53a travels, and intersects with the third light path. On the third light path, a collimator lens 33c which collimates the third optical signal emitted from the LD 53a is disposed between the LD 53a and the first reflection mirror 62a.

The second reflection mirror 62b is disposed on a light path (fourth light path) through which the fourth optical signal emitted from the LD 54a travels, and intersects with the fourth light path. On the fourth light path, a collimator lens 33d which collimates the fourth optical signal emitted from the LD 54a is disposed between the LD 54a and the second reflection mirror 62b.

Figure 6A:
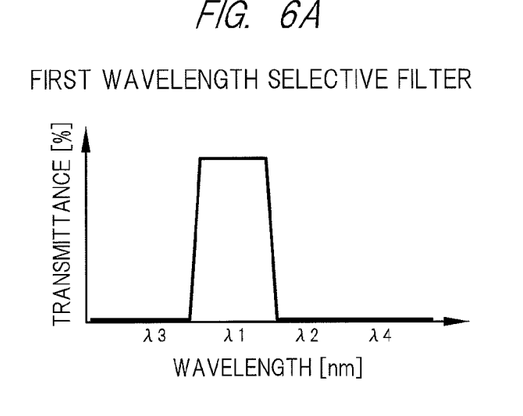
FIG. 6A is a diagram showing optical transmission characteristics of a first wavelength selective filter shown in FIG. 5.
Figure 6B:
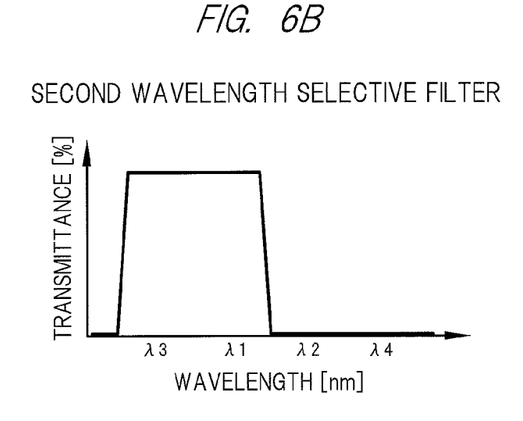
FIG. 6B is a diagram showing optical transmission characteristics of a second wavelength selective filter shown in FIG. 5.
Figure 6C:
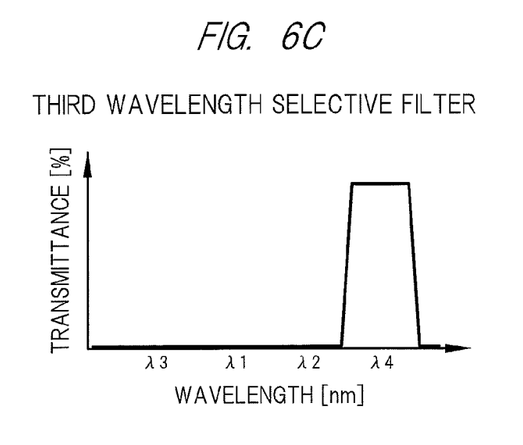
FIG. 6C is a diagram showing optical transmission characteristics of a third wavelength selective filter shown in FIG. 5.

FIG. 6A to FIG. 6C show the optical transmission characteristics of each of the wavelength selective filters 61. As shown in FIG. 6A, the first wavelength selective filter 61a is a band-pass filter which transmits at least the first optical signal ($\lambda 1$ [nm]) and reflects at least the third optical signal ($\lambda 3$ [nm]).

As shown in FIG. 6B, the second wavelength selective filter 61b is a band-pass filter which transmits at least the first optical signal ($\lambda 1$ [nm]) and the third optical signal ($\lambda 3$ [nm]) and reflects at least the second optical signal ($\lambda 2$ [nm]) and the fourth optical signal ($\lambda 4$ [nm]).

As shown in FIG. 6C, the third wavelength selective filter 61c is a band-pass filter which transmits at least the fourth optical signal ($\lambda 4$ [nm]) and reflects at least the second optical signal ($\lambda 2$ [nm]).

With reference to FIG. 5 again, the first optical signal emitted from the LD 51a enters the first wavelength selective filter 61a through the collimator lens 33a. Since the first wavelength selective filter 61a has the optical transmission characteristics (wavelength selective characteristics) shown in FIG. 6A, the first optical signal which has entered the first wavelength selective filter 61a passes through the first wavelength selective filter 61a and enters the second wavelength selective filter 61b. Since the second wavelength selective filter 61b has the optical transmission characteristics shown in FIG. 6B, the first optical signal which has entered the second wavelength selective filter 61b passes through the second wavelength selective filter 61b and enters the lens 40a through the isolator 41. As described above, the first optical signal sequentially passes through the first wavelength selective filter 61a and the second wavelength selective filter 61b to reach the lens 40a. That is, the number of filter transmissions of the first optical signal is two.

The second optical signal emitted from the LD 52a enters the third wavelength selective filter 61c through the collimator lens 33b. Since the third wavelength selective filter 61c has the optical transmission characteristics shown in FIG. 6C, the second optical signal which has entered the third wavelength selective filter 61c is reflected by the third wavelength selective filter 61c and enters the second wavelength selective filter 61b. Since the second wavelength selective filter 61b has the optical transmission characteristics shown in FIG. 6B, the second optical signal which has entered the second wavelength selective filter 61b is reflected by the second wavelength selective filter 61b and enters the lens 40a through the isolator 41. As described above, the second optical signal is sequentially reflected by the third wavelength selective filter 61c and the second wavelength selective filter 61b to reach the lens 40a. That is, the number of filter transmissions of the second optical signal is two.

The third optical signal emitted from the LD 53a enters the first reflection mirror 62a through the collimator lens 33c. The third optical signal which has entered the first reflection mirror 62a is reflected by the first reflection mirror 62a and enters the first wavelength selective filter 61a. Since the first wavelength selective filter 61a has the optical transmission characteristics shown in FIG. 6A, the third optical signal which has entered the first wavelength selective filter 61a is reflected by the first wavelength selective filter 61a and enters the second wavelength selective filter 61b. Since the second wavelength selective filter 61b has the optical transmission characteristics shown in FIG. 6B, the third optical signal which has entered the second wavelength selective filter 61b passes through the second wavelength selective filter 61b and enters the lens 40a through the isolator 41. As described above, the third optical signal is reflected by the first reflection mirror 62a, is reflected by the first wavelength selective filter 61a and passes through the second wavelength selective filter 61b to reach the lens 40a. That is, the number of filter transmissions of the third optical signal is three.

The fourth optical signal emitted from the LD 54a enters the second reflection mirror 62b through the collimator lens 33d. The fourth optical signal which has entered the second reflection mirror 62b is reflected by the second reflection mirror 62b and enters the third wavelength selective filter 61c. Since the third wavelength selective filter 61c has the optical transmission characteristics shown in FIG. 6C, the fourth optical signal which has entered the third wavelength selective filter 61c passes through the third wavelength selective filter 61c and enters the second wavelength selective filter 61b. Since the second wavelength selective filter 61b has the optical transmission characteristics shown in FIG. 6B, the fourth optical signal which has entered the second wavelength selective filter 61b is reflected by the second wavelength selective filter 61b and enters the lens 40a through the isolator 41. As described above, the fourth optical signal is reflected by the second reflection mirror 62b, passes through the third wavelength selective filter 61c and is reflected by the second wavelength selective filter 61b to reach the lens 40a. That is, the number of filter transmissions of the fourth optical signal is three.

As described above, the first reflection mirror 62a reflects the third optical signal emitted from the LD 53a to make the third optical signal enter the first wavelength selective filter 61a. The second reflection mirror 62b reflects the fourth optical signal emitted from the LD 54*a* to make the fourth optical signal enter the third wavelength selective filter 61*c*.

The third wavelength selective filter 61*c* reflects the second optical signal emitted from the LD 52*a* to make the second optical signal enter the second wavelength selective filter 61*b*, and transmits the fourth optical signal reflected by the second reflection mirror 62*b* to make the fourth optical signal enter the second wavelength selective filter 61*b*.

The first wavelength selective filter 61*a* transmits the first optical signal emitted from the LD 51*a* to make the first optical signal enter the second wavelength selective filter 61*b*, and reflects the third optical signal reflected by the first reflection mirror 62*a* to make the third optical signal enter the second wavelength selective filter 61*b*.

The second wavelength selective filter 61*b* transmits the first optical signal which has passed through the first wavelength selective filter 61*a* and the third optical signal reflected by the first wavelength selective filter 61*a* to make the first optical signal and the third optical signal enter the lens 40*a*. Also, the second wavelength selective filter 61*b* reflects the second optical signal reflected by the third wavelength selective filter 61*c* and the fourth optical signal which has passed through the third wavelength selective filter 61*c* to make the second optical signal and the fourth optical signal enter the lens 40*a*. As a result, the multiplexed optical signal obtained by multiplexing the first optical signal, the second optical signal, the third optical signal and the fourth optical signal is emitted from the lens 40*a*.

In this embodiment, the optical signals enter the wavelength selective filter 61 and the reflection mirror 62 at an incident angle of 45 degrees or smaller.

Note that the receiver optical sub-assembly provided in the optical communication module of this embodiment has substantially the same structure as that of the transmitter optical sub-assembly 11.

As described above, the number of filter transmissions of the optical signals in the transmitter optical sub-assembly (optical transmitter module) 11 and the receiver optical sub-assembly (optical receiver module) of this embodiment is three at most. Also, in the transmitter optical sub-assembly (optical transmitter module) 11 of this embodiment, a plurality of light emitting elements are disposed in a row in the order of wavelength of the optical signals emitted from each of the light emitting elements. In general, the arrangement of electric wirings connected to the light emitting elements follows the order of the oscillation wavelengths of the light emitting elements. Therefore, when the light emitting elements are disposed in a row in the order of oscillation wavelength, the arrangement of the electric wirings connected to the light emitting elements is facilitated. The magnitude relation of the wavelength of the optical signals of this embodiment is $\lambda 3 < \lambda 1 < \lambda 2 < \lambda 4$. However, the magnitude relation of the wavelength of the optical signals can be changed to $\lambda 3 > \lambda 1 > \lambda 2 > \lambda 4$. In this case, the characteristics of the wavelength selective filters are also changed in accordance with the magnitude relation of the wavelength of the optical signals.

The present invention is not limited to the foregoing embodiments and various modifications and alterations can be made within the scope of the present invention. For example, in the first embodiment described above, the incident angles of the optical signals to the wavelength selective filter 31 and the reflection mirror 32 are 45 degrees. However, the incident angles of the optical signals to the wavelength selective filter and the reflection mirror are not limited to 45 degrees, and can be selected arbitrarily. Also, the incident angles of the optical signals to each of the wavelength selective filters and reflection mirrors do not have to be the same.

Nevertheless, if the incident angle of the optical signal to the wavelength selective filter becomes larger, the number of laminated optical thin films required to obtain equivalent wavelength selective characteristics increases, so that the manufacturing cost of the wavelength selective filter increases. Also, if the incident angle of the optical signal to the wavelength selective filter is made smaller, the incidence plane of the wavelength selective filter can be decreased. Thus, from the viewpoint of the cost reduction and the size reduction, the incident angle of the optical signal to the wavelength selective filter is preferably 45 degrees or less, and is more preferably 5 degrees or more and 20 degrees or less. Note that the incident angle of the optical signal to the wavelength selective filter is the angle formed between the normal at the incident point of the optical signal on the wavelength selective filter and the optical axis of the optical signal.

Figure 7:
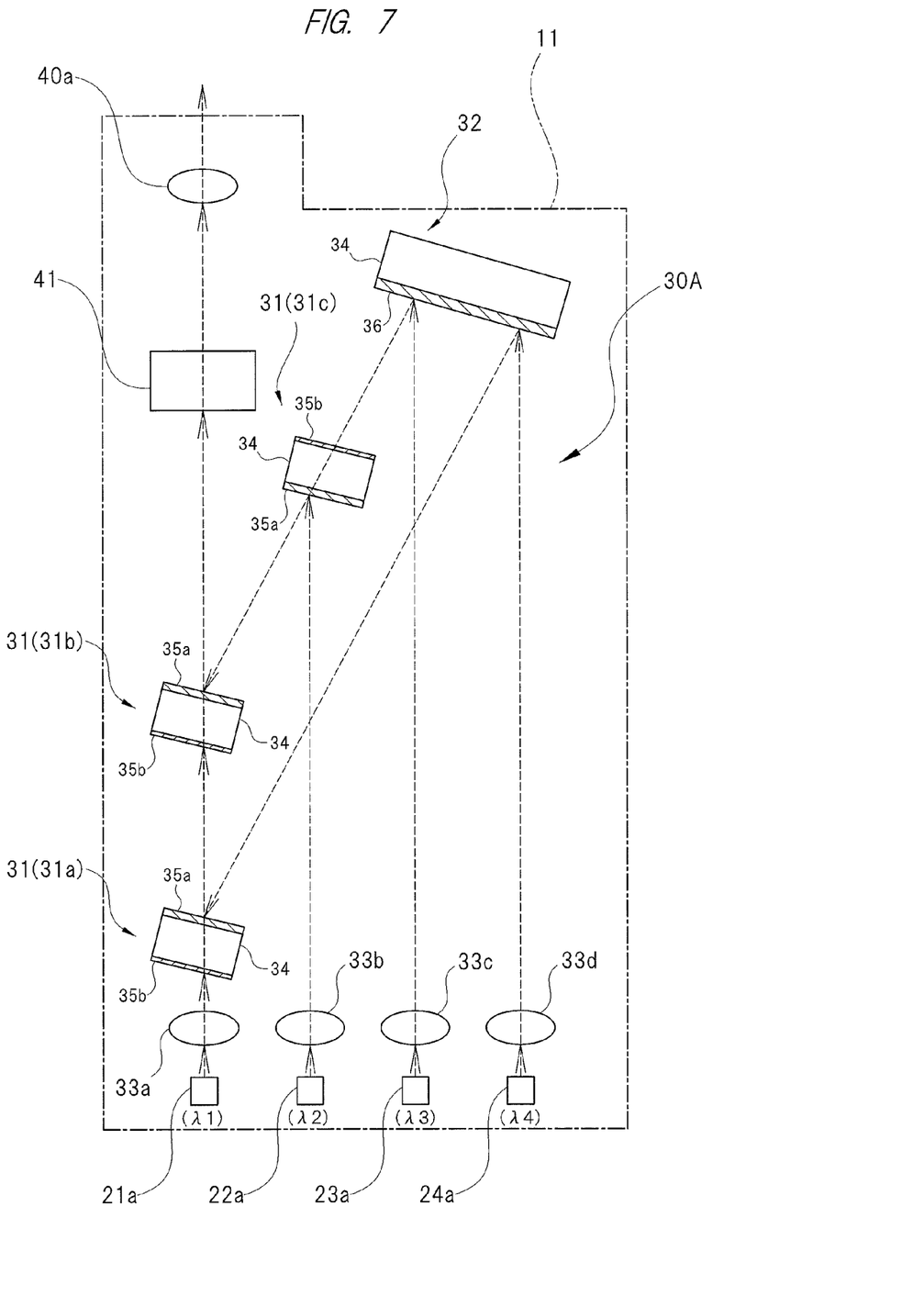
FIG. 7 is a schematic diagram showing another configuration of an optical transmitter module (transmitter optical sub-assembly)

FIG. 7 shows a configuration example of the multiplexing optical system in which the incident angles of the optical signals to the wavelength selective filters and the reflection mirror are smaller than 45 degrees. In the multiplexing optical system 30A shown in FIG. 7, the incident angles of the third optical signal and the fourth optical signal to the reflection mirror 32 are 15 degrees. The incident angle of the second optical signal to the third wavelength selective filter 31*c* is also 15 degrees. Further, the incident angles of the second optical signal and the third optical signal to the second wavelength selective filter 31*b* are also 15 degrees, and the incident angle of the fourth optical signal to the first wavelength selective filter 31*a* is also 15 degrees.

The collimator lenses 33*a*, 33*b*, 33*c* and 33*d* shown in FIG. 3, FIG. 5 and FIG. 7 can be replaced with a lens array in which these lenses are integrated. Also, it is enough if the reflection mirrors 32, 62 and 82 have the characteristics capable of reflecting the optical signals having predetermined wavelengths ($\lambda 1$, $\lambda 2$, $\lambda 3$ and $\lambda 4$), and the reflection mirrors need not to be total reflection mirrors. Further, the reflection mirrors 32, 62 and 82 can be replaced with a metal plate or a glass plate having a reflection film formed thereon instead of a multi-layer filter.

What is claimed is:

1. An optical transmitter module which outputs a multiplexed optical signal obtained by multiplexing four optical signals each having different wavelengths, comprising:

a first light emitting element which emits a first optical signal;

a second light emitting element which emits a second optical signal;

a third light emitting element which emits a third optical signal;

a fourth light emitting element which emits a fourth optical signal;

a first wavelength selective filter and a second wavelength selective filter disposed on a light path of the first optical signal along a traveling direction of the first optical signal;

a third wavelength selective filter disposed on a light path of the second optical signal;

a reflection mirror disposed on light paths of the third optical signal and the fourth optical signal; and a lens from which a multiplexed optical signal obtained by multiplexing the first optical signal, the second optical signal, the third optical signal and the fourth optical signal is emitted, wherein the reflection mirror reflects the fourth optical signal to make the fourth optical signal enter the first wavelength selective filter and reflects the third optical signal to make the third optical signal enter the third wavelength selective filter, the third wavelength selective filter reflects the second optical signal to make the second optical signal enter the second wavelength selective filter and transmits the third optical signal reflected by the reflection mirror to make the third optical signal enter the second wavelength selective filter, the first wavelength selective filter transmits the first optical signal to make the first optical signal enter the second wavelength selective filter and reflects the fourth optical signal reflected by the reflection mirror to make the fourth optical signal enter the second wavelength selective filter, and the second wavelength selective filter transmits the first optical signal which has passed through the first wavelength selective filter and the fourth optical signal reflected by the first wavelength selective filter to make the first optical signal and the fourth optical signal enter the lens and reflects the second optical signal reflected by the third wavelength selective filter and the third optical signal which has passed through the third wavelength selective filter to make the second optical signal and the third optical signal enter the lens.

2. An optical transmitter module which outputs a multiplexed optical signal obtained by multiplexing four optical signals each having different wavelengths, comprising:

a first light emitting element which emits a first optical signal;

a second light emitting element which emits a second optical signal;

a third light emitting element which emits a third optical signal;

a fourth light emitting element which emits a fourth optical signal;

a first wavelength selective filter and a second wavelength selective filter disposed on a light path of the first optical signal along a traveling direction of the first optical signal;

a third wavelength selective filter disposed on a light path of the second optical signal;

a first reflection mirror disposed on a light path of the third optical signal;

a second reflection mirror disposed on a light path of the fourth optical signal; and a lens from which a multiplexed optical signal obtained by multiplexing the first optical signal, the second optical signal, the third optical signal and the fourth optical signal is emitted, wherein the first reflection mirror reflects the third optical signal to make the third optical signal enter the first wavelength selective filter, the second reflection mirror reflects the fourth optical signal to make the fourth optical signal enter the third wavelength selective filter, the first wavelength selective filter transmits the first optical signal to make the first optical signal enter the second wavelength selective filter and reflects the third optical signal reflected by the first reflection mirror to make the third optical signal enter the second wavelength selective filter, the third wavelength selective filter reflects the second optical signal to make the second optical signal enter the second wavelength selective filter and transmits the fourth optical signal reflected by the second reflection mirror to make the fourth optical signal enter the second wavelength selective filter, and the second wavelength selective filter transmits the first optical signal which has passed through the first wavelength selective filter and the third optical signal reflected by the first wavelength selective filter to make the first optical signal and the third optical signal enter the lens and reflects the second optical signal reflected by the third wavelength selective filter and the fourth optical signal which has passed through the third wavelength selective filter to make the second optical signal and the fourth optical signal enter the lens.

3. The optical transmitter module according to claim 1, wherein wavelengths of the first optical signal and the fourth optical signal are wavelengths adjacent to each other.

4. The optical transmitter module according to claim 3, wherein the first light emitting element, the second light emitting element, the third light emitting element and the fourth light emitting element are disposed in this order in a row.

5. The optical transmitter module according to claim 2, wherein a wavelength of the first optical signal is longer than a wavelength of the third optical signal, a wavelength of the second optical signal is longer than the wavelength of the first optical signal, and a wavelength of the fourth optical signal is longer than the wavelength of the second optical signal.

6. The optical transmitter module according to claim 2, wherein a wavelength of the first optical signal is shorter than a wavelength of the third optical signal, a wavelength of the second optical signal is shorter than the wavelength of the first optical signal, and a wavelength of the fourth optical signal is shorter than the wavelength of the second optical signal.

7. The optical transmitter module according to claim 5, wherein the third light emitting element, the first light emitting element, the second light emitting element and the fourth light emitting element are disposed in this order in a row.

8. The optical transmitter module according to claim 6, wherein the third light emitting element, the first light emitting element, the second light emitting element and the fourth light emitting element are disposed in this order in a row.

9. The optical transmitter module according to claim 1, wherein at least one of an incident angle of the fourth optical signal to the first wavelength selective filter, an incident angle of the third optical signal to the second wavelength selective filter and an incident angle of the second optical signal to the third wavelength selective filter is 5 degrees or more and 20 degrees or less.

10. The optical transmitter module according to claim 2, wherein at least one of an incident angle of the third optical signal to the first wavelength selective filter, an incident angle of the fourth optical signal to the second wavelength selective filter and an incident angle of the second optical signal to the third wavelength selective filter is 5 degrees or more and 20 degrees or less.

* * * * *